(12) United States Patent
Zou et al.

(10) Patent No.: US 11,507,234 B2
(45) Date of Patent: Nov. 22, 2022

(54) TOUCH SUBSTRATE, MANUFACTURING METHOD THEREOF, AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Fuwei Zou, Beijing (CN); Ming Zhang, Beijing (CN); Zhanqi Xu, Beijing (CN); Ting Zeng, Beijing (CN); Tsungchieh Kuo, Beijing (CN)

(73) Assignees: HEFEI XINSHENG OPTOELECTRONICS TECHNOLOGY CO., LTD., Anhui; BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 521 days.

(21) Appl. No.: 16/339,076

(22) PCT Filed: Jul. 26, 2018

(86) PCT No.: PCT/CN2018/097149
§ 371 (c)(1),
(2) Date: Apr. 3, 2019

(87) PCT Pub. No.: WO2019/095721
PCT Pub. Date: May 23, 2019

(65) Prior Publication Data
US 2021/0342034 A1    Nov. 4, 2021

(30) Foreign Application Priority Data
Nov. 17, 2017    (CN) .......................... 201711147189.7

(51) Int. Cl.
*G06F 3/044*    (2006.01)
*G06F 3/041*    (2006.01)
(Continued)

(52) U.S. Cl.
CPC ........ *G06F 3/0446* (2019.05); *G02F 1/13338* (2013.01); *G02F 1/133512* (2013.01);
(Continued)

(58) Field of Classification Search
CPC combination set(s) only.
See application file for complete search history.

(56) References Cited

U.S. PATENT DOCUMENTS

2014/0176490 A1    6/2014 Zhou et al.
2014/0313431 A1    10/2014 Chang et al.
(Continued)

FOREIGN PATENT DOCUMENTS

CN    203178992 U    9/2013
CN    103901650 A    7/2014
(Continued)

OTHER PUBLICATIONS

Search Report and Written Opinion for International Application No. PCT/Cn2018/097149 dated Oct. 24. 2018.
First Office Action for Chinese Patent Application No. 201711147189.7 dated Apr. 22, 2019.
Second Office Action for Chinese Patent Application No. 201711147189.7 dated Jul. 15, 2019.

*Primary Examiner* — Deeprose Subedi
(74) *Attorney, Agent, or Firm* — Calfee, Halter & Griswold LLP (57) ABSTRACT

A touch substrate, a manufacturing method thereof, and a display device. The touch substrate includes: a basal substrate; a first touch electrode, a black matrix, and a second touch electrode located on a first surface of the basal substrate; an orthographic projection of the first touch electrode on the basal substrate and an orthographic projection of the second touch electrode on the basal substrate at least (Continued)

partially overlap with each other; the first touch electrode and the second touch electrode are insulated from each other; in an overlapping area of the first touch electrode and the second touch electrode, the black matrix is located between the first touch electrode and the second touch electrode.

16 Claims, 4 Drawing Sheets

(51) Int. Cl.
*G02F 1/1335* (2006.01)
*G02F 1/1333* (2006.01)
*G02F 1/1343* (2006.01)

(52) U.S. Cl.
CPC ...... *G02F 1/134309* (2013.01); *G06F 3/0412* (2013.01); *G06F 2203/04103* (2013.01); *G06F 2203/04111* (2013.01)

(56) References Cited

U.S. PATENT DOCUMENTS

| | | | |
|---|---|---|---|
| 2015/0029148 A1* | 1/2015 | Wang | G06F 3/0445 345/174 |
| 2016/0178948 A1 | 6/2016 | Li et al. | |
| 2016/0239133 A1* | 8/2016 | Ko | G06F 3/0448 |
| 2017/0060309 A1* | 3/2017 | Chen | G02F 1/133514 |
| 2019/0018530 A1* | 1/2019 | Lee | H01L 27/3244 |

FOREIGN PATENT DOCUMENTS

| | | | | |
|---|---|---|---|---|
| CN | 104035621 A | 9/2014 | | |
| CN | 104461150 A | 3/2015 | | |
| CN | 104932163 A | 9/2015 | | |
| CN | 107844219 A | 3/2018 | | |
| WO | WO016173153 A1 * | 11/2016 | ....... | G02F 1/133512 |

* cited by examiner

S401 providing the basal substrate

S402 arranging the first touch electrode, the black matrix and the second touch electrode on the first surface of the basal substrate

TOUCH SUBSTRATE, MANUFACTURING METHOD THEREOF, AND DISPLAY DEVICE

RELATED APPLICATIONS

The present application is the U.S. national phase entry of the international application PCT/CN2018/097149, with an international filing date of Jul. 26, 2018, which claims the benefit of Chinese Patent Application No. 201711147189.7, filed on Nov. 17, 2017, the entire disclosures of which are incorporated herein by reference.

TECHNICAL FIELD

The present disclosure relates to the field of touch control technology, and particularly to a touch substrate, a manufacturing method thereof, and a display device.

BACKGROUND

Currently, touch screen technology has been increasingly widely used in display technology. The existing touch screen technologies mainly include resistive type, capacitive type and infrared optical type. Since the capacitive touch screen has higher reaction speed than the resistive touch screen and can realize multi-touch, it has a promising market in the field of touch screens. Infrared optical touch screen technology is mainly applied to large-size touch screens. The following three technologies can usually be used to realize capacitive touch screens: one is the OGS technology that directly attaches the touch screen on the display panel; the other is the in-cell technology that embeds the touch panel into the display panel; another is the on-cell technology that embeds the touch screen between the display panel and the polarizer.

SUMMARY

According to an aspect of the disclosure, an exemplary embodiment of the present disclosure provides a touch substrate. The touch substrate includes: a basal substrate; a first touch electrode, a black matrix, and a second touch electrode located on a first surface of the basal substrate; an orthographic projection of the first touch electrode on the basal substrate and an orthographic projection of the second touch electrode on the basal substrate at least partially overlap with each other; the first touch electrode and the second touch electrode are insulated from each other; in an overlapping area of the first touch electrode and the second touch electrode, the black matrix is located between the first touch electrode and the second touch electrode.

In some exemplary embodiments, the first touch electrode and the second touch electrode are respectively grids formed by intersecting metal lines; an orthographic projection of the black matrix on the basal substrate completely covers the orthographic projection of the first touch electrode on the basal substrate and the orthographic projection of the second touch electrode on the basal substrate.

In some exemplary embodiments, in the overlapping area, the first touch electrode and the second touch electrode are respectively in direct contact with the black matrix; a material of the black matrix is an insulating material.

In some exemplary embodiments, a material of the first touch electrode and a material of the second touch electrode are metal.

In some exemplary embodiments, each one of the first touch electrode and the second touch electrode has a centrosymmetric shape, and an orthographic projection of a symmetric center of the first touch electrode on the basal substrate overlaps with an orthographic projection of a symmetric center of the second touch electrode on the basal substrate.

In some exemplary embodiments, the first touch electrode and the second touch electrode have the same shape.

In some exemplary embodiments, the orthographic projection of the first touch electrode on the basal substrate and the orthographic projection of the second touch electrode on the basal substrate are mutually staggered.

In some exemplary embodiments, a line width of the black matrix is in a range of 5 μm to 10 μm, and a line width of the first touch electrode and the second touch electrode is in a range of 3 μm to 5 μm.

According to another aspect of the present disclosure, an exemplary embodiment provides a method for manufacturing the touch substrate according to the above exemplary embodiments, including: providing the basal substrate; and arranging the first touch electrode, the black matrix and the second touch electrode on the first surface of the basal substrate.

In some exemplary embodiments, the step of arranging the first touch electrode, the black matrix and the second touch electrode on the first surface of the basal substrate includes: arranging the first touch electrode on the first surface of the basal substrate, arranging the black matrix on a surface of the first touch electrode facing away from the basal substrate, the black matrix being in direct contact with the first touch electrode; and arranging the second touch electrode on a surface of the black matrix facing away from the basal substrate, the second touch electrode being in direct contact with the black matrix.

Based on the same inventive concept, an exemplary embodiment provides a display device including the above mentioned touch substrate. The display device can be any product or component with display function, such as mobile phone, tablet computer, TV, display, notebook computer, digital photo frame and navigator. The implementation of the display device can refer to exemplary embodiments of the above mentioned touch substrate, which will not be repeated herein.

In some exemplary embodiments, the display device includes a plurality of pixel units arranged in an array; the first touch electrode and the second touch electrode are respectively grids formed by intersecting metal lines, and each one of the first touch electrode and the second touch electrode has at least one opening; at least one pixel unit is located in the opening; each one of the intersecting metal lines is located between adjacent pixel units.

In some exemplary embodiments, the display device further includes: a counter substrate disposed opposite to the basal substrate; a liquid crystal layer disposed between the basal substrate and the counter substrate. The first surface of the basal substrate faces the counter substrate.

In some exemplary embodiments, the display device further includes: an electroluminescent display panel disposed opposite to the basal substrate; the first surface of the basal substrate faces the electroluminescent display panel.

In some exemplary embodiments, the black matrix includes a plurality of black matrix openings, and the touch substrate further includes a plurality of filters arranged on the first surface of the basal substrate; the plurality of filters are located in the black matrix openings.

BRIEF DESCRIPTION OF THE DRAWINGS

In order to more clearly illustrate the technical solutions in embodiments of the disclosure or in the prior art, the appended drawings needed to be used in the description of the exemplary embodiments or the prior art will be introduced briefly in the following. Obviously, the drawings in the following description are only some embodiments of the disclosure, and for those of ordinary skills in the art, other drawings may be obtained according to these drawings.

DETAILED DESCRIPTION OF THE DISCLOSURE

In the following, the technical solutions in embodiments of the disclosure will be described clearly and completely in connection with the drawings in the exemplary embodiments of the disclosure. Obviously, the described exemplary embodiments are only part of the embodiments of the disclosure, and not all of the embodiments. Based on the exemplary embodiments in the disclosure, all other embodiments obtained by those of ordinary skill in the art pertain to the protection scope of the disclosure.

The inventors have found that for existing touch screens, sensitivity, shadow elimination effect, lightness, and small thickness of the product have to be improved. In view of this, the exemplary embodiments of the present disclosure provide a touch substrate, a manufacturing method thereof, and a display device, which improve the sensitivity of the touch, the shadow elimination effect, the lightness and thinness of the product.

Figure 1:
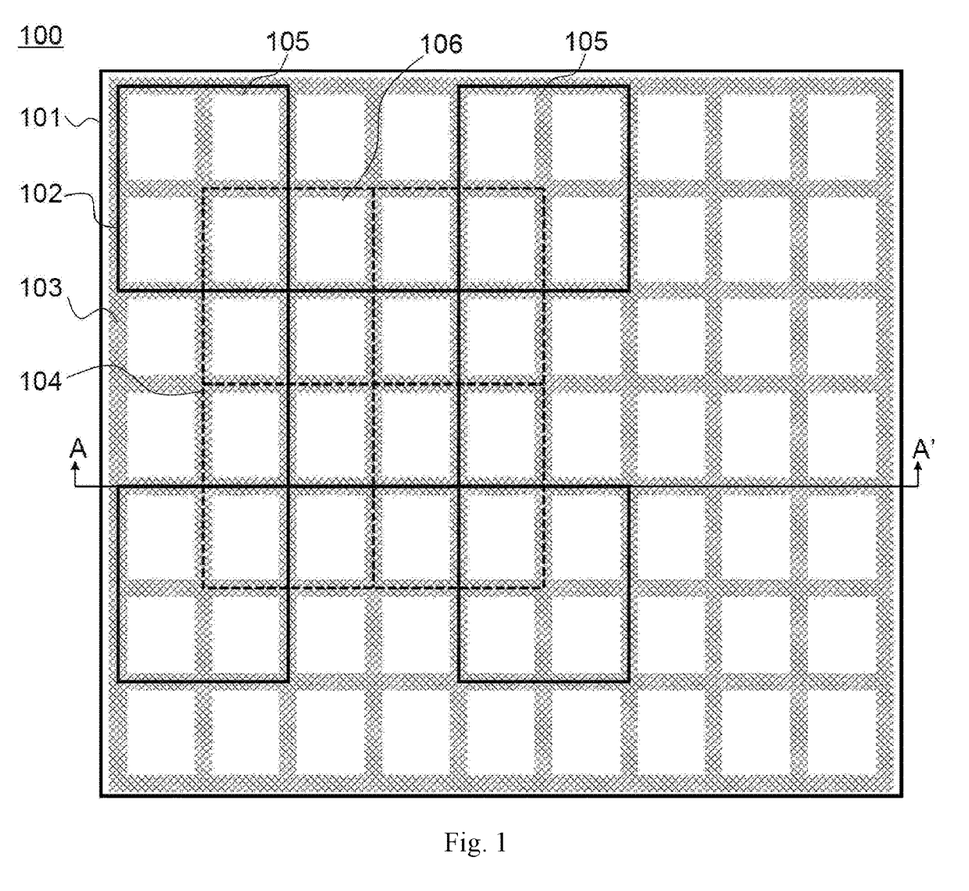
FIG. 1 is a schematic diagram of a local structure of a touch substrate according to an exemplary embodiment.
Figure 2:
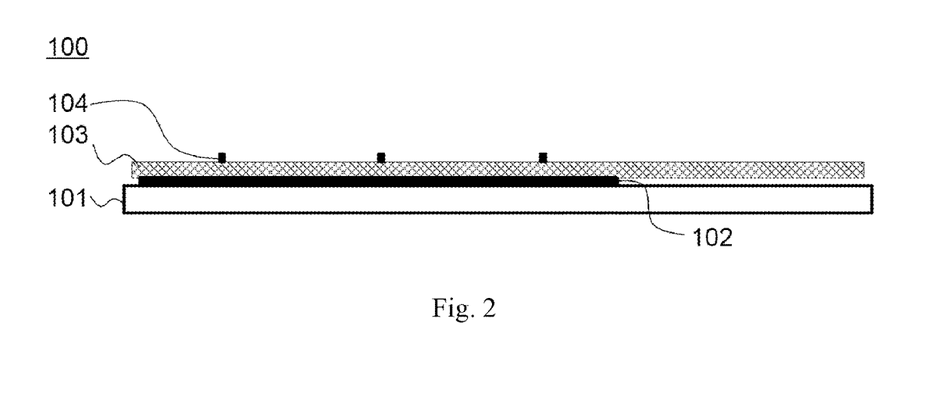
FIG. 2 is a schematic cross-sectional view of the touch substrate shown in FIG. 1 taken along line AA'.

According to an aspect of the disclosure, as shown in FIG. 1 and FIG. 2, an exemplary embodiment provides a touch substrate 100. The touch substrate 100 includes: a basal substrate 101; a first touch electrode 102, a black matrix 103, and a second touch electrode 104 located on a first surface of the basal substrate; an orthographic projection of the first touch electrode 102 on the basal substrate 101 and an orthographic projection of the second touch electrode 104 on the basal substrate 101 at least partially overlap with each other; the first touch electrode 102 and the second touch electrode 104 are insulated from each other; in an overlapping area of the first touch electrode 102 and the second touch electrode 104, the black matrix 103 is located between the first touch electrode 102 and the second touch electrode 104.

In the exemplary embodiment, the touch substrate includes the first touch electrode disposed on the first surface of the basal substrate, the black matrix disposed on a side of the first touch electrode facing away from the basal substrate, and the second touch electrode disposed on a side of the black matrix facing away from the basal substrate. Compared with the arrangement in the related art in which the first touch electrode and the second touch electrode are disposed in the same layer, the embodiment of the present disclosure effectively increases the capacitance between the first touch electrode and the second touch electrode by using the stacked arrangement, thereby improving the sensitivity of touch control. Compared with the touch substrate of the mutual capacitance mode in the related art, the exemplary embodiment provides a larger capacitance, while an arrangement of a bridge is not required. Moreover, by applying the stacked arrangement, the touch component including the first touch electrode and the second touch electrode can be disposed inside the display device (i.e., forming an in-cell or on-cell arrangement, as shown in the exemplary embodiments of FIG. 5 and FIG. 6) further improves the lightness and thinness of the product.

In the exemplary embodiment, the touch substrate 100 may include a plurality of first touch electrodes 102 and a plurality of second touch electrodes 104. The plurality of first touch electrodes 102 and the plurality of second touch electrodes 104 are in one-to-one correspondence. Optionally, the first touch electrode 102 is a transmitting electrode, and the second touch electrode 104 is a sensing electrode. Those skilled in the art can understand that the first touch electrode 102 can also be a sensing electrode, and the second touch electrode 104 can also be a transmitting electrode.

In some exemplary embodiments, as shown in FIG. 1, the first touch electrode 102 and the second touch electrode 104 are respectively grids formed by intersecting metal lines; an orthographic projection of the black matrix 103 on the basal substrate 101 completely covers the orthographic projection of the first touch electrode 102 on the basal substrate 101 and the orthographic projection of the second touch electrode 104 on the basal substrate 101.

Optionally, the first touch electrode 102 has at least one first opening 105, and the second touch electrode 104 has at least one second opening 106; in a direction perpendicular to the basal substrate, the orthographic projection of the black matrix completely covers the orthographic projection of the first touch electrode and the orthographic projection of the second touch electrode. For example, in the exemplary embodiment shown in FIG. 1, the first touch electrode 102 has five first openings 105, and the second touch electrode 104 has four second openings 106. The orthographic projection of the black matrix 103 on the basal substrate 101 completely covers the orthographic projection of the first touch electrode 102 on the basal substrate 101 and the orthographic projection of the second touch electrode 104 on the basal substrate 101, thereby improving the shadow elimination effect more effectively.

In some exemplary embodiments, as shown in FIG. 2, in the overlapping area, the first touch electrode 102 and the second touch electrode 104 are respectively in direct contact with the black matrix 103; a material of the black matrix 103 is an insulating material.

Optionally, in the overlapping area, the first touch electrode and the second touch electrode are in direct contact with the black matrix, respectively; the material of the black matrix is an insulating material. Thus, the arrangement of the touch electrodes can be achieved by applying only three layers of material (for example, using photolithography). Moreover, since the orthographic projection of the black matrix completely covers the orthographic projection of the first touch electrode and the orthographic projection of the second touch electrode, the black matrix can be used as an insulating layer, thereby completely separating the first touch electrode and the second touch electrode. Therefore, the above arrangement further improves the thinning of the product and simplifies the manufacturing process. Those skilled in the art can understand that a planarization layer can also be disposed between the first touch electrode/ second touch electrode and the black matrix.

In some exemplary embodiments, a material of the first touch electrode 102 and a material of the second touch electrode 104 are metal.

Optionally, the first touch electrode and the second touch electrode are fabricated using a metal material, thereby enhancing conductivity of the touch electrode. Therefore, the line width of the touch electrode can be further reduced, thereby improving the optical performance such as the transmittance of the touch substrate. However, those skilled in the art can understand that other conductive materials (such as ITO) can also be used to fabricate the first touch electrode and the second touch electrode.

In some exemplary embodiments, as shown in FIG. 1, each one of the first touch electrode 102 and the second touch electrode 104 has a centrosymmetric shape, and an orthographic projection of a symmetric center of the first touch electrode on the basal substrate overlaps with an orthographic projection of a symmetric center of the second touch electrode on the basal substrate.

Figure 3:
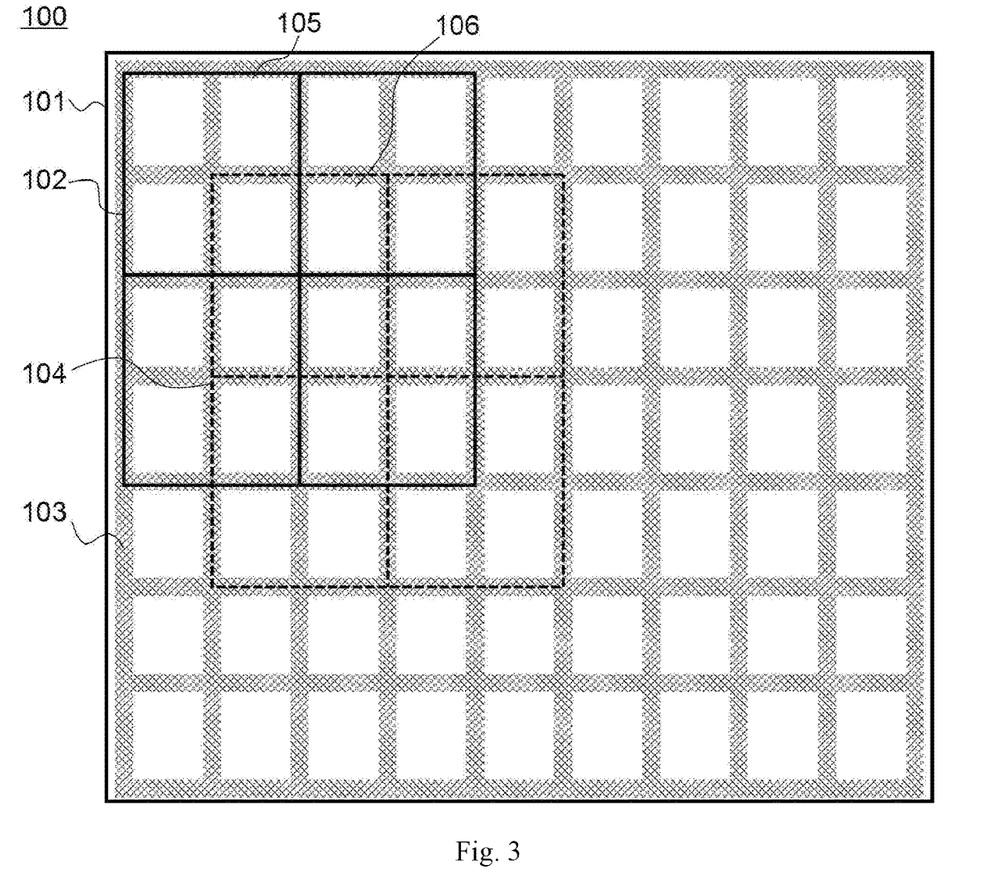
FIG. 3 is a schematic diagram of a local structure of a touch substrate according to another exemplary embodiment.

In some exemplary embodiments, the touch substrate 100 may include a plurality of first touch electrodes 102 and a plurality of second touch electrodes 104; as shown in FIG. 3, each first touch electrode 102 and the corresponding second touch electrode 104 have the same shape. For example, in the exemplary embodiment shown in FIG. 3, each first touch electrode 102 has four first openings 105, and the corresponding second touch electrode 104 also has four second openings 106. Each first touch electrode 102 and the corresponding second touch electrode 104 have the same shape.

Optionally, each first touch electrode and the corresponding second touch electrode have the same shape. Therefore, the first touch electrode and the second touch electrode can be fabricated by using the same mask, which reduces the number of masks in the manufacturing process, simplifies the manufacturing process, and reduces the manufacturing cost.

In some exemplary embodiments, as shown in FIG. 3, the orthographic projection of the first touch electrode 102 on the basal substrate 101 and the orthographic projection of the second touch electrode 104 on the basal substrate 101 are mutually staggered.

Optionally, the orthographic projection of the first touch electrode on the basal substrate and the orthographic projection of the second touch electrode on the basal substrate are mutually staggered. In this way, the first touch electrode and the second touch electrode having a small area can be used to detect a large area (as shown in FIG. 3), which further simplifies the manufacturing process and reduces the manufacturing cost while ensuring the sensitivity.

In some exemplary embodiments, as shown in FIG. 1 to FIG. 3, a line width of the black matrix 103 is in a range of 5 μm to 10 μm, and a line width of the first touch electrode 102 and the second touch electrode 104 is in a range of 3 μm to 5 μm.

Optionally, the black matrix has a line width of 5 μm to 10 μm, and the first touch electrode and the second touch electrode have a line width of 3 μm to 5 μm. In combination with the alignment accuracy in the art, when the alignment accuracy is, for example, ±3 μm, the black matrix, the first touch electrode, and the second touch electrode can be formed by using the above line width, and the orthographic projection of the black matrix can completely cover the orthographic projection of the first touch electrode and the orthographic projection of the second touch electrode, ensuring the optical performance of the product.

Figure 4:
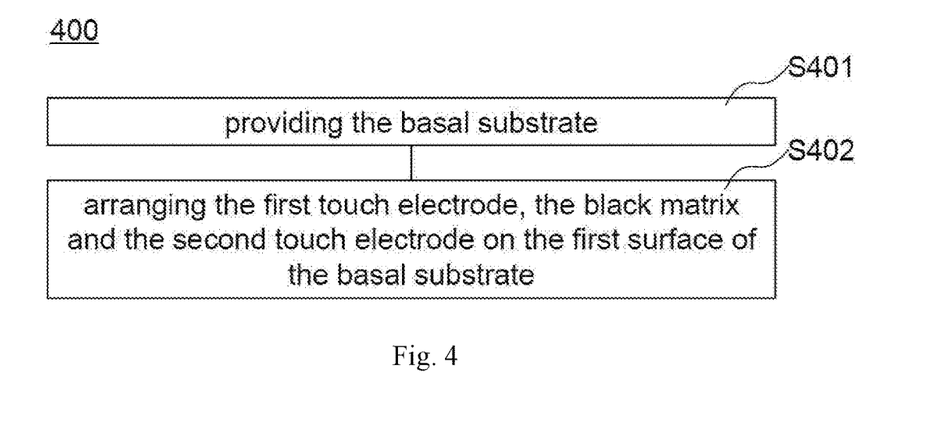
FIG. 4 is a flow chart of a method for manufacturing a touch substrate according to an exemplary embodiment.

According to another aspect of the present disclosure, as shown in FIG. 4, an embodiment of the present disclosure provides a method 400 for manufacturing the touch substrate according to the above embodiments. The method 400 includes: S401 providing the basal substrate; and S402 arranging the first touch electrode, the black matrix and the second touch electrode on the first surface of the basal substrate.

In the exemplary embodiment of the present disclosure, the touch substrate includes the first touch electrode disposed on the first surface of the basal substrate, the black matrix disposed on a side of the first touch electrode facing away from the basal substrate, and the second touch electrode disposed on a side of the black matrix facing away from the basal substrate. Compared with the arrangement in the related art in which the first touch electrode and the second touch electrode are disposed in the same layer, the embodiment of the present disclosure effectively increases the capacitance between the first touch electrode and the second touch electrode by using the stacked arrangement, thereby improving the sensitivity of touch control. Compared with the touch substrate of the mutual capacitance mode in the related art, the embodiment of the present disclosure provides a larger capacitance, while an arrangement of a bridge is not required. Moreover, by applying the stacked arrangement, the touch component including the first touch electrode and the second touch electrode can be disposed inside the display device (i.e., forming an in-cell or on-cell arrangement, as shown in the embodiments of FIG. 5 and FIG. 6) further improves the lightness and thinness of the product.

In some exemplary embodiments, the step of arranging the first touch electrode, the black matrix and the second touch electrode on the first surface of the basal substrate includes: arranging the first touch electrode on the first surface of the basal substrate, arranging the black matrix on a surface of the first touch electrode facing away from the basal substrate, the black matrix being in direct contact with the first touch electrode; and arranging the second touch electrode on a surface of the black matrix facing away from the basal substrate, the second touch electrode being in direct contact with the black matrix.

Optionally, in the overlapping area, the first touch electrode and the second touch electrode are in direct contact with the black matrix, respectively; the material of the black matrix is an insulating material. Thus, the arrangement of the touch electrodes can be achieved by applying only three layers of material (for example, using photolithography). Moreover, since the orthographic projection of the black matrix completely covers the orthographic projection of the first touch electrode and the orthographic projection of the second touch electrode, the black matrix can be used as an insulating layer, thereby completely separating the first touch electrode and the second touch electrode. Therefore, the above arrangement further improves the thinning of the product and simplifies the manufacturing process. Those skilled in the art can understand that a planarization layer can also be disposed between the first touch electrode/ second touch electrode and the black matrix.

Figure 5:
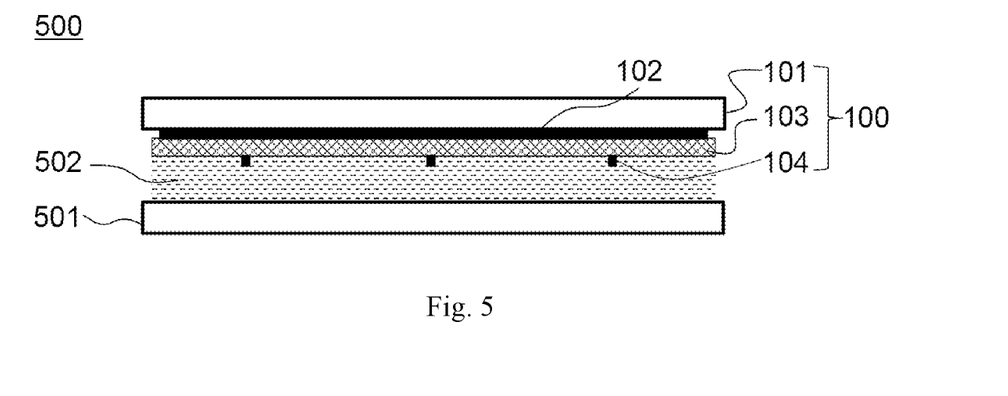
FIG. 5 is a schematic diagram of a display device according to an exemplary embodiment.
Figure 6:
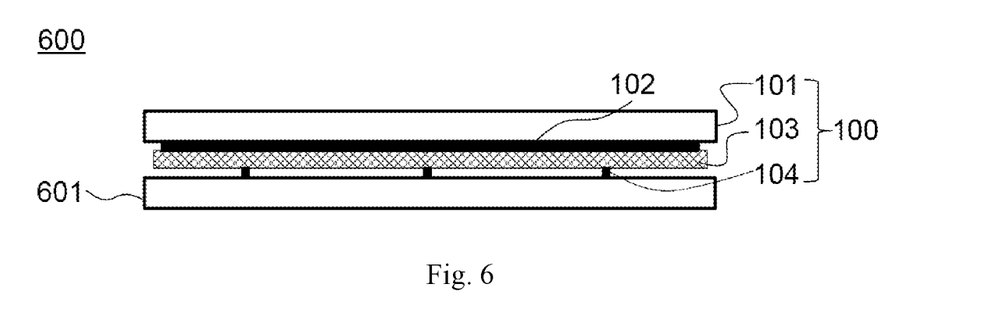
FIG. 6 is a schematic diagram of a display device according to another exemplary embodiment.

Based on the same inventive concept, as shown in FIG. 5 and FIG. 6, an embodiment of the present disclosure provides a display device 500/600 including the above mentioned touch substrate 100. The display device can be any product or component with display function, such as mobile phone, tablet computer, TV, display, notebook computer, digital photo frame and navigator. The implementation of the display device can refer to exemplary embodiments of the above mentioned touch substrate, which will not be repeated herein.

Figure 7:
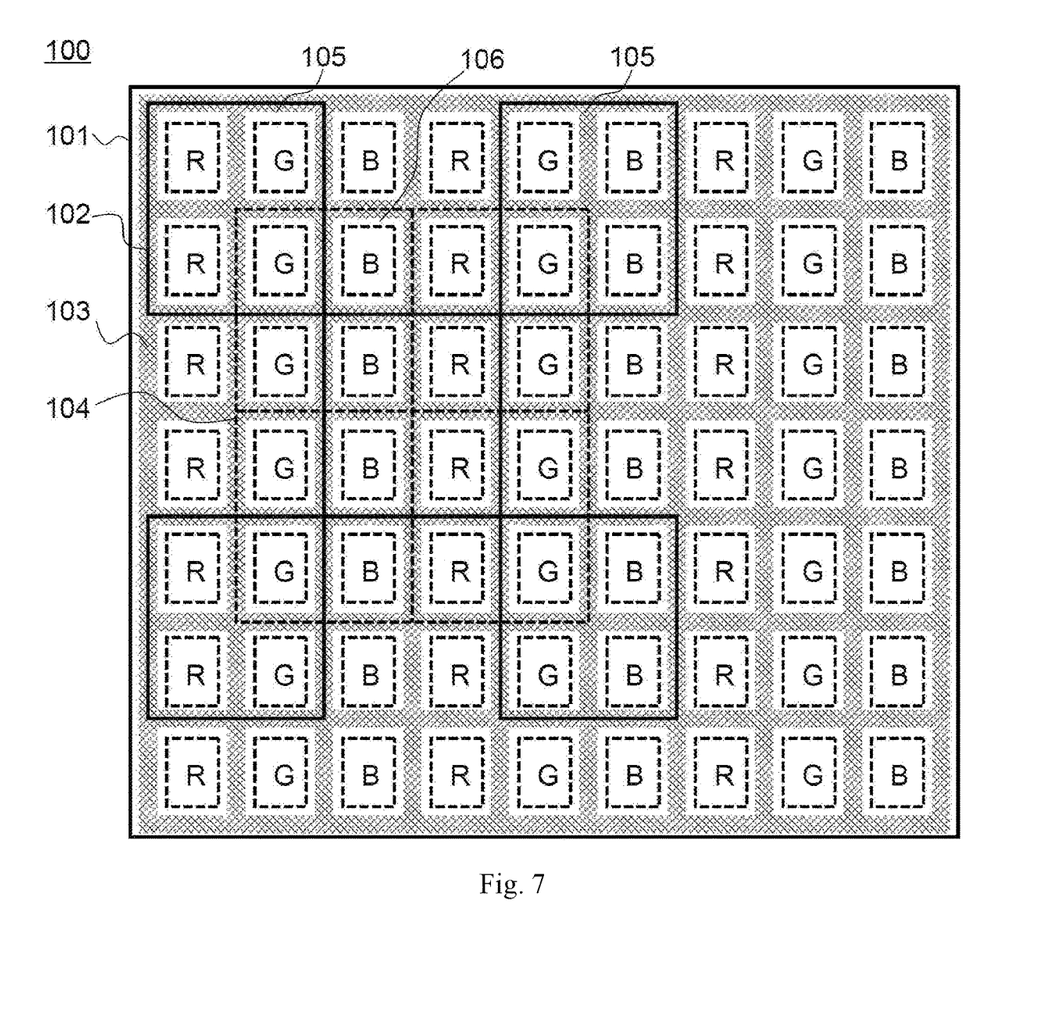
FIG. 7 is a schematic diagram of a display device according to yet another exemplary embodiment.

In some exemplary embodiments, as shown in FIG. 7, the display device 500/600 includes a plurality of pixel units (R, G and B) arranged in an array; the first touch electrode 102 and the second touch electrode 104 are respectively grids formed by intersecting metal lines, and each one of the first touch electrode 102 and the second touch electrode 104 has at least one opening (105, 106); at least one pixel unit (R, G and B) is located in the opening; each one of the intersecting metal lines is located between adjacent pixel units.

In some exemplary embodiments, as shown in FIG. 5, the display device 500 further includes: a counter substrate 501 disposed opposite to the basal substrate 101; a liquid crystal layer 502 disposed between the basal substrate 101 and the counter substrate 501. The first surface of the basal substrate (i.e., the surface on which the first touch electrode 102, the black matrix 103, and the second touch electrode 104 are disposed) faces the counter substrate 501.

In some exemplary embodiments, as shown in FIG. 6, the display device 600 further includes: an electroluminescent display panel 601 disposed opposite to the basal substrate 101; the first surface of the basal substrate 101 (i.e., the surface on which the first touch electrode 102, the black matrix 103, and the second touch electrode 104 are disposed) faces the electroluminescent display panel 601.

Optionally, the electroluminescent display panel may be an OLED display panel. Further, the OLED display panel may be a white light OLED display panel. In this way, an OLED touch control display device with an on-cell arrangement can be realized.

In some exemplary embodiments, the black matrix includes a plurality of black matrix openings, and the touch substrate further includes a plurality of filters arranged on the first surface of the basal substrate; the plurality of filters are located in the black matrix openings.

Hereinafter, two examples of the present disclosure will be described in conjunction with the exemplary embodiments shown in FIG. 1, FIG. 3, FIG. 5, and FIG. 6.

EXAMPLE 1

Step 1: A first touch electrode 102 (for example, a sensing electrode) of metal is formed on the first surface of the basal substrate 101 (for example, a color filter substrate) by a photolithography process. The formed first touch electrode 102 is as shown in FIG. 1. The first touch electrode 102 is aligned with the basal substrate 101 or the alignment mark on the basal substrate 101. The line width of the first touch electrode 102 is 4±1 μm, and the alignment accuracy is ±3 μm.

Step 2: An insulating black matrix 103 is formed on the first touch electrode 102 by a photolithography process. The black matrix 103 is aligned with the alignment mark of the first touch electrode 102 or the first touch electrode 102. The black matrix 103 has a line width of 7±1 μm and an alignment accuracy of ±3 μm. Therefore, in the direction perpendicular to the basal substrate 101, the first touch electrode 102 is completely covered by the black matrix 103, ensuring the optical performance such as aperture ratio and shadow elimination effect of the product.

Step 3: A second touch electrode 104 (for example, a transmitting electrode) is formed on the black matrix 103 by a photolithography process. The formed second touch electrode 104 is as shown in FIG. 1. The second touch electrode 104 is aligned with the black matrix 103 or the alignment mark on the black matrix 103. The line width of the second touch electrode 104 is 4±1 μm, and the alignment accuracy is ±3 μm. Therefore, in the direction perpendicular to the basal substrate 101, the second touch electrode 104 is completely covered by the black matrix 103, ensuring the optical performance such as aperture ratio and shadow elimination effect of the product. A top view in which the first touch electrode 102, the black matrix 103, and the second touch electrode 104 are stacked together is as shown in FIG. 1 or FIG. 3.

Step 4: the touch substrate and an array substrate for liquid crystal display are pressed together. The first surface of the basal substrate (i.e., the surface on which the first touch electrode 102, the black matrix 103, and the second touch electrode 104 are disposed) faces the array substrate (as shown in FIG. 5). An in-cell liquid crystal touch control display device is completed by performing processes such as liquid crystal (LC) injection, POL (polarizer) attachment, and cover lens (cover plate) attachment.

EXAMPLE 2

Step 1: A first touch electrode 102 (for example, a sensing electrode) of metal is formed on the first surface of the basal substrate 101 (for example, a color filter substrate) by a photolithography process. The formed first touch electrode 102 is as shown in FIG. 1. The first touch electrode 102 is aligned with the basal substrate 101 or the alignment mark on the basal substrate 101. The line width of the first touch electrode 102 is 4±1 μm, and the alignment accuracy is ±3 μm.

Step 2: An insulating black matrix 103 is formed on the first touch electrode 102 by a photolithography process. The black matrix 103 is aligned with the alignment mark of the first touch electrode 102 or the first touch electrode 102. The black matrix 103 has a line width of 7±1 μm and an alignment accuracy of ±3 μm. Therefore, in the direction perpendicular to the basal substrate 101, the first touch electrode 102 is completely covered by the black matrix 103, ensuring the optical performance such as aperture ratio and shadow elimination effect of the product.

Step 3: A second touch electrode 104 (for example, a transmitting electrode) is formed on the black matrix 103 by a photolithography process. The formed second touch electrode 104 is as shown in FIG. 1. The second touch electrode 104 is aligned with the black matrix 103 or the alignment mark on the black matrix 103. The line width of the second touch electrode 104 is 4±1 μm, and the alignment accuracy is ±3 μm. Therefore, in the direction perpendicular to the basal substrate 101, the second touch electrode 104 is completely covered by the black matrix 103, ensuring the optical performance such as aperture ratio and shadow elimination effect of the product. A top view in which the first touch electrode 102, the black matrix 103, and the second touch electrode 104 are stacked together is as shown in FIG. 1 or FIG. 3.

Step 4: the touch substrate and an array substrate for OLED display are pressed together. The first surface of the basal substrate (i.e., the surface on which the first touch electrode 102, the black matrix 103, and the second touch electrode 104 are disposed) faces the array substrate (as shown in FIG. 6). An on-cell OLED touch control display device is completed by performing processes such as cover lens (cover plate) attachment.

In the touch substrate, the manufacturing method thereof, and the display device provided by the exemplary embodiments, the touch substrate includes the first touch electrode disposed on the first surface of the basal substrate, the black matrix disposed on a side of the first touch electrode facing away from the basal substrate, and the second touch electrode disposed on a side of the black matrix facing away from the basal substrate. Compared with the arrangement in the related art in which the first touch electrode and the second touch electrode are disposed in the same layer, the exemplary embodiment effectively increases the capacitance between the first touch electrode and the second touch electrode by using the stacked arrangement, thereby improving the sensitivity of touch control. Compared with the touch substrate of the mutual capacitance mode in the related art, the exemplary embodiment provides a larger capacitance, while an arrangement of a bridge is not required. Moreover, by applying the stacked arrangement, the touch component including the first touch electrode and the second touch electrode can be disposed inside the display device (i.e., forming an in-cell or on-cell arrangement, as shown in the embodiments of FIG. 5 and FIG. 6) further improves the lightness and thinness of the product.

The above embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

What is claimed is:

1. A touch substrate, comprising:
   a basal substrate;
   a first touch electrode, a black matrix, and a second touch electrode located on a first surface of the basal substrate;
   wherein an orthographic projection of the first touch electrode on the basal substrate and an orthographic projection of the second touch electrode on the basal substrate at least partially overlap with each other; the first touch electrode and the second touch electrode are insulated from each other;
   in an overlapping area of the first touch electrode and the second touch electrode, the black matrix is located between the first touch electrode and the second touch electrode;
   wherein the orthographic projection of the first touch electrode on the basal substrate and the orthographic projection of the second touch electrode on the basal substrate are mutually staggered and partially overlapped with each other, the first touch electrode and the second touch electrode have a same shape fabricated by using a same mask, the first touch electrode has a plurality of first openings, the second touch electrode has a plurality of second openings, and an orthographic projection of at least one first opening on the basal substrate is located within the orthographic projection of the second touch electrode on the basal substrate.

2. The touch substrate according to claim 1, wherein the first touch electrode and the second touch electrode are respectively grids formed by intersecting metal lines; an orthographic projection of the black matrix on the basal substrate completely covers the orthographic projection of the first touch electrode on the basal substrate and the orthographic projection of the second touch electrode on the basal substrate.

3. The touch substrate according to claim 1, wherein in the overlapping area, the first touch electrode and the second touch electrode are respectively in direct contact with the black matrix; a material of the black matrix is an insulating material.

4. The touch substrate according to claim 1, wherein a material of the first touch electrode and a material of the second touch electrode are metal.

5. The touch substrate according to claim 1, wherein each one of the first touch electrode and the second touch electrode has a centrosymmetric shape, and an orthographic projection of a symmetric center of the first touch electrode on the basal substrate overlaps with an orthographic projection of a symmetric center of the second touch electrode on the basal substrate.

6. The touch substrate according to claim 1, wherein a line width of the black matrix is in a range of 5 μm to 10 μm, and a line width of the first touch electrode and the second touch electrode is in a range of 3 μm to 5 μm.

7. A method for manufacturing the touch substrate according to claim 1, comprising:
   providing the basal substrate; and
   arranging the first touch electrode, the black matrix and the second touch electrode on the first surface of the basal substrate;
   wherein the orthographic projection of the first touch electrode on the basal substrate and the orthographic projection of the second touch electrode on the basal substrate are mutually staggered and partially overlapped with each other, and the first touch electrode and the second touch electrode are fabricated by using a same mask; the first touch electrode and the second touch electrode have a same shape, the first touch electrode has a plurality of first openings, the second touch electrode has a plurality of second openings, and an orthographic projection of at least one first opening on the basal substrate is located within the orthographic projection of the second touch electrode on the basal substrate.

8. The method according to claim 7, wherein arranging the first touch electrode, the black matrix and the second touch electrode on the first surface of the basal substrate comprises:
   arranging the first touch electrode on the first surface of the basal substrate, arranging the black matrix on a surface of the first touch electrode facing away from the basal substrate, the black matrix being in direct contact with the first touch electrode; and arranging the second touch electrode on a surface of the black matrix facing away from the basal substrate, the second touch electrode being in direct contact with the black matrix.

9. A display device comprising the touch substrate according to claim 1.

10. The display device according to claim 9, wherein the display device comprises a plurality of pixel units arranged in an array;
    the first touch electrode and the second touch electrode are respectively grids formed by intersecting metal lines, and each one of the first touch electrode and the second touch electrode has at least one opening; at least one pixel unit is located in the opening; each one of the intersecting metal lines is located between adjacent pixel units.

11. The display device according to claim 9, further comprising:
    a counter substrate disposed opposite to the basal substrate;
    a liquid crystal layer disposed between the basal substrate and the counter substrate;

wherein the first surface of the basal substrate faces the counter substrate.

12. The display device according to claim 9, further comprising:
an electroluminescent display panel disposed opposite to the basal substrate;
wherein the first surface of the basal substrate faces the electroluminescent display panel.

13. The display device according to claim 9, wherein the black matrix comprises a plurality of black matrix openings, and the touch substrate further comprises a plurality of filters arranged on the first surface of the basal substrate; the plurality of filters are located in the black matrix openings.

14. The display device according to claim 9, wherein in the overlapping area, the first touch electrode and the second touch electrode are respectively in direct contact with the black matrix; a material of the black matrix is an insulating material.

15. The display device according to claim 9, wherein each one of the first touch electrode and the second touch electrode has a centrosymmetric shape, and an orthographic projection of a symmetric center of the first touch electrode on the basal substrate overlaps with an orthographic projection of a symmetric center of the second touch electrode on the basal substrate.

16. The display device according to claim 9, wherein a line width of the black matrix is in a range of 5 μm to 10 μm, and a line width of the first touch electrode and the second touch electrode is in a range of 3 μm to 5 μm.

\* \* \* \* \*